US012646767B2

(12) United States Patent
Tang et al.

(10) Patent No.: US 12,646,767 B2
(45) Date of Patent: Jun. 2, 2026

(54) CASE OF BATTERY, BATTERY, POWER CONSUMING DEVICE, AND METHOD AND APPARATUS FOR MANUFACTURING BATTERY

(71) Applicant: CONTEMPORARY AMPEREX TECHNOLOGY (HONG KONG) LIMITED, Hong Kong (CN)

(72) Inventors: Yu Tang, Ningde City (CN); Haiqi Yang, Ningde City (CN); Zhimin Zeng, Ningde City (CN); Xu Zhang, Ningde City (CN); Peng Wang, Ningde City (CN); Xiaoteng Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 697 days.

(21) Appl. No.: 17/900,909

(22) Filed: Sep. 1, 2022

(65) Prior Publication Data
US 2023/0030834 A1 Feb. 2, 2023

Related U.S. Application Data

(63) Continuation of application No. PCT/CN2021/109456, filed on Jul. 30, 2021.

(51) Int. Cl.
*H01M 10/6569* (2014.01)
*H01M 10/613* (2014.01)
(Continued)

(52) U.S. Cl.
CPC ..... *H01M 10/6569* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

2009/0120620 A1* 5/2009 Abe .................... H01M 10/643
165/104.31
2011/0008658 A1* 1/2011 Holken ................. H01M 50/30
429/82
(Continued)

FOREIGN PATENT DOCUMENTS

CN 105084629 A 11/2015
CN 207441811 U * 6/2018
(Continued)

OTHER PUBLICATIONS

Machine English Translation of CN-207967074-U originally published to Ke Oct. 12, 2018 (Year: 2018).*
(Continued)

*Primary Examiner* — Mary Grace Byram
(74) *Attorney, Agent, or Firm* — XSENSUS LLP

(57) ABSTRACT

Embodiments of the present application provide a case of a battery, a battery, a power consuming device, and a method and an apparatus for manufacturing a battery. The case may comprise: a cooling component, a liquid collection structure being arranged on the cooling component, and the liquid collection structure being configured to gather a condensate generated by the cooling component; and a first wall, a liquid storage structure being arranged on the first wall, the liquid storage structure being arranged corresponding to the liquid collection structure, and the liquid storage structure being configured to collect the condensate gathered by the liquid collection structure.

13 Claims, 7 Drawing Sheets

(51) Int. Cl.

| | |
|---|---|
| *H01M 10/625* | (2014.01) |
| *H01M 10/647* | (2014.01) |
| *H01M 10/6556* | (2014.01) |
| *H01M 10/6567* | (2014.01) |
| *H01M 10/6568* | (2014.01) |
| *H01M 50/204* | (2021.01) |
| *H01M 50/209* | (2021.01) |
| *H01M 50/233* | (2021.01) |
| *H01M 50/271* | (2021.01) |
| *H01M 50/682* | (2021.01) |
| *H01M 50/691* | (2021.01) |
| *H01M 50/249* | (2021.01) |

(52) U.S. Cl.
CPC ..... *H01M 10/647* (2015.04); *H01M 10/6556* (2015.04); *H01M 10/6567* (2015.04); *H01M 10/6568* (2015.04); *H01M 50/204* (2021.01); *H01M 50/209* (2021.01); *H01M 50/233* (2021.01); *H01M 50/271* (2021.01); *H01M 50/682* (2021.01); *H01M 50/691* (2021.01); *H01M 50/249* (2021.01); *H01M 2220/20* (2013.01); *Y02E 60/10* (2013.01)

(56) References Cited

U.S. PATENT DOCUMENTS

| | | | |
|---|---|---|---|
| 2013/0252043 A1 | 9/2013 | Allison | |
| 2014/0178719 A1* | 6/2014 | Store | B60L 3/0046 |
| | | | 429/82 |
| 2016/0093870 A1* | 3/2016 | DeKeuster | H01M 50/20 |
| | | | 429/89 |
| 2021/0143190 A1 | 5/2021 | Hu et al. | |

FOREIGN PATENT DOCUMENTS

| | | | | |
|---|---|---|---|---|
| CN | 207967074 | A | 10/2018 | |
| CN | 109817842 | A | 5/2019 | |
| CN | 109873101 | A | 6/2019 | |
| CN | 210786807 | U | 6/2020 | |
| CN | 211719657 | U | * 10/2020 | |
| CN | 112018300 | A | 12/2020 | |
| CN | 112018321 | A | 12/2020 | |
| CN | 112129032 | A | 12/2020 | |
| CN | 212625894 | U | 2/2021 | |
| JP | 2022110745 | A | 7/2022 | |
| JP | 2023535097 | A | 8/2023 | |
| JP | 2023542485 | A | 10/2023 | |
| WO | WO-2012076808 | A1 | * 6/2012 | .............. B60L 50/64 |
| WO | WO-2013037786 | A1 | * 3/2013 | .......... H01M 50/211 |
| WO | 2021/116629 | A1 | 6/2021 | |

OTHER PUBLICATIONS

Gurera et al, Bioinspired conical design for efficient water collection from fog, Philosophical Transactions A, Apr. 29, 2019 (Year: 2019).*

Machine English translation of CN-207441811-U from Espacenet originally published to Shao Jun. 1, 2018 (Year: 2018).*

Machine English translation of CN-211719657-U from Espacenet originally published to Lin Oct. 20, 2020 (Year: 2020).*

Machine English translation of WO-2012076808-A1 originally published to Lefebvre Jun. 14, 2012 (Year: 2012).*

Machine English translation of WO2013037786A1 originally published to Klammer Mar. 21, 2013 (Year: 2013).*

Machine English translation of CN112129032A originally published to Tao Dec. 25, 2020 (Year: 2020).*

Extended European Search Report issued May 3, 2023 in European Patent Application No. 21927082.4, 22 pages.

Decision to Grant a Patent issued May 27, 2024 in Japanese Patent Application No. 2022-558524 with English translation.

International Search Report and Written Opinion mailed on Apr. 26, 2022, received for PCT Application PCT/CN2021/109456, filed on Jul. 30, 2021, 15 pages including English Translation.

Office Action issued Jun. 18, 2025 in Chinese Patent Application No. 202180072785.1 with English translation thereof.

Office Action issued Oct. 22, 2025 in Chinese Patent Application No. 202180072785.1 with English translation thereof.

Office Action issued Jan. 20, 2026 in Chinese Patent Application No. 202180072785.1 with English translation thereof.

* cited by examiner

300

400

CASE OF BATTERY, BATTERY, POWER CONSUMING DEVICE, AND METHOD AND APPARATUS FOR MANUFACTURING BATTERY

CROSS REFERENCE TO RELATED APPLICATION

The present application is a continuation of International Application No. PCT/CN2021/109456, filed Jul. 30, 2021, the entire content of which is incorporated herein by reference in its entirety.

TECHNICAL FIELD

The present application relates to the technical field of batteries, and in particular, to a case of a battery, a battery, a power consuming device, and a method and an apparatus for manufacturing a battery.

BACKGROUND

With increasingly worse environmental pollutions, a new energy industry has been concerned by more and more people. In the new energy industry, battery technology is an important factor in its development.

During the development of the battery technology, the problem of safety is not negligible. If the safety of batteries cannot be guaranteed, the batteries cannot be used.

In high-temperature and high-humidity environment, a condensate is likely to be formed inside a case of the battery, which will cause potential safety hazards and impairs the safety of the battery. Therefore, how to enhance the safety of batteries is an urgent technical problem to be solved in the battery technology.

SUMMARY OF THE DISCLOSURE

Embodiments of the present application provide a case of a battery, a battery, a power consuming device, and a method and an apparatus for manufacturing a battery, which can enhance the safety of the battery.

In a first aspect, a case of a battery is provided, the case comprising: a cooling component or structure, a liquid collection structure being arranged on the cooling component, and the liquid collection structure being configured to gather a condensate generated by the cooling component; and a first wall, a liquid storage structure being arranged on the first wall, the liquid storage structure being arranged corresponding to the liquid collection structure, and the liquid storage structure being configured to collect the condensate gathered by the liquid collection structure.

In the embodiments of the present application, the liquid collection structure is provided on the cooling component, the condensate generated by the cooling component is gathered by using the liquid collection structure, the liquid storage structure corresponding to the liquid collection structure is provided on the first wall of the case, and the condensate gathered by the liquid collection structure is collected by using the liquid storage structure. In this way, it is possible to keep the condensate away from an electrical connection region in the case, and therefore, the safety of the battery can be enhanced.

In a possible implementation, the cooling component may be integrated in an upper cover of the case so as to reduce occupied space.

In a possible implementation, the cooling component projects toward the liquid storage structure at a position corresponding to the liquid storage structure to form the liquid collection structure. The projecting region has a larger curvature compared with other planar regions of the cooling component, and makes the condensate more likely to be gathered, such that the condensate can be gathered in this region.

In a possible implementation, the liquid collection structure is a pointed projection or an arc-shaped projection. The pointed projection or the arc-shaped projection has a large curvature, and can gather the condensate.

In a possible implementation, the cooling component comprises a connecting region, a transitional region and a main body region, the connecting region being configured 5 to connect the first wall, the connecting region and the main body region being located in different planes, the transitional region connecting the connecting region and the main body region to form two corner structures, and the one of the two corner structures close to the liquid storage structure forming the liquid collection structure. The corner structure has the larger curvature compared with other planar regions of the cooling component, and makes the condensate more likely to accumulate, such that the condensate can accumulate at this corner structure.

In a possible implementation, a plane in which the connecting region is located is closer to the liquid storage structure than a plane in which the main body region is located, and the corner structure formed by connecting the transitional region to the connecting region forms the liquid collection structure. In this case, the condensate at the corner structure farther from the liquid storage structure may also flow to the corner structure closer to the liquid storage structure along the transitional region, i.e., the liquid collection structure. Therefore, with the above arrangement, more condensate accumulates in the liquid collection structure and then enters the liquid storage structure.

In a possible implementation, the first wall comprises a plurality of sub-walls connected to form a cavity of the liquid storage structure, with an opening of the cavity corresponding to the liquid collection structure. The cavity has the opening at a position corresponding to the liquid collection structure to form the liquid storage structure, such that the condensate gathered by the liquid collection structure can be allowed to enter the liquid storage structure through the opening.

In a possible implementation, the opening is formed in the direction of gravity of the liquid collection structure. In this way, the condensate gathered by the liquid collection structure can drip to the liquid storage structure through the opening.

In a possible implementation, the liquid storage structure is isolated from an electrical chamber of the case, and the electrical chamber is configured to accommodate battery cells. By isolating the liquid storage structure from the electrical chamber, the fact that the condensate enters the electrical chamber and then comes into contact with electrical connections within the electrical chamber is avoided.

In a possible implementation, a moisture adsorption structure is provided in the liquid storage structure for adsorbing the condensate. The condensate is adsorbed by the 5 moisture adsorption structure, such that the condensate can be prevent from diffusing, and potential safety hazards can be reduced.

In a possible implementation, a flow guiding structure is provided in the first wall for discharging the condensate from the case. The condensate can be discharged from the case by means of the flow guiding structure, which reduces the potential safety hazards and thus ensures the safety of the battery.

In a second aspect, a battery is provided, the battery comprising: battery cells; and a case according to the first aspect, wherein the battery cells are accommodated in the case.

In a third aspect, a power consuming device is provided, the power consuming device comprising: a battery according to the second aspect, the battery being configured to supply electric energy.

In a fourth aspect, a method for manufacturing a battery is provided, the method comprising: providing battery cells; providing a case, the case comprising: a cooling component, a liquid collection structure being arranged on the cooling component, and the liquid collection structure being configured to gather a condensate generated by the cooling component; and a first wall, a liquid storage structure being arranged on the first wall, the liquid storage structure being arranged corresponding to the liquid collection structure, and the liquid storage structure being configured to collect the condensate gathered by the liquid collection structure; and placing the battery cells in the case.

In a fifth aspect, an apparatus for manufacturing a battery is provided, the apparatus comprising a module or structure for carrying out the method according to the fourth aspect.

In the technical solutions of the embodiments of the present application, the liquid collection structure is provided on the cooling component, the condensate generated by the cooling component is gathered by using the liquid collection structure, the liquid storage structure corresponding to the liquid collection structure is provided on the first wall of the case, and the condensate gathered by the liquid collection structure is collected by using the liquid storage structure. In this way, it is possible to keep the condensate away from an electrical connection region in the case, and therefore, the safety of the battery can be enhanced.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
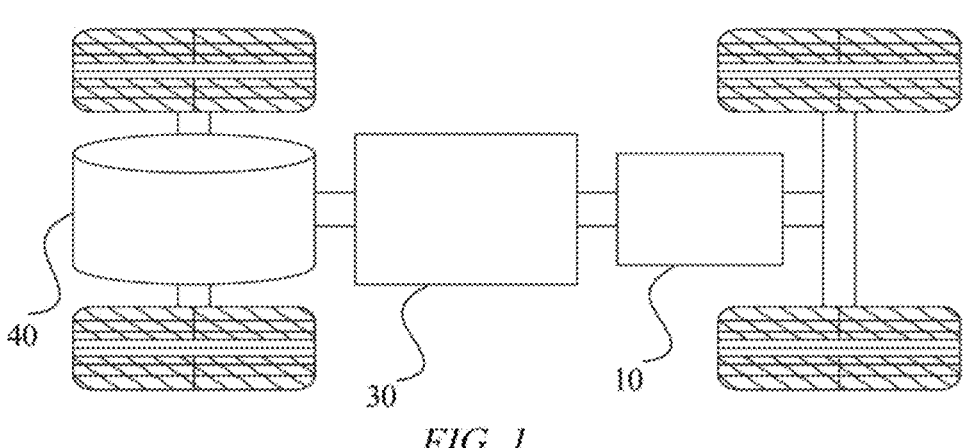
FIG. 1 is a schematic diagram of a vehicle according to an embodiment of the present application.

In the drawings, the drawings are not drawn to the actual scale.

DETAILED DESCRIPTION OF EMBODIMENTS

The following further describes in detail implementations of the present application with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

In the description of the present application, it should be noted that all technological and scientific terms used herein have the same meanings as those commonly understood by those skilled in the art to which the present application belongs. The terms used are merely for the purpose of describing specific embodiments, and are not intended to limit the present application. The terms "comprise" and "have" and any variations thereof in the specification and the claims of the present application as well as the foregoing description of the accompanying drawings are intended to cover non-exclusive inclusions. The term "a plurality of" means two or more. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. The term "perpendicular" is not necessarily perpendicular in the strict sense, and a range of errors is allowed. The term "parallel" is not necessarily parallel in the strict sense, and a range of errors is allowed.

The phrase "embodiments" referred to in the present application means that the specific features, structures and characteristics described in conjunction with the embodiments may be are included in at least one embodiment of the present application. This phrase in various places in the specification does not necessarily refer to the same embodiment, or an independent or alternative embodiment exclusive of other embodiments. Those skilled in the art understand, in explicit and implicit manners, that an embodiment described in the present application may be combined with another embodiment.

The orientation terms in the following description all indicate directions shown 5 in the drawings, and do not impose a limitation on a specific structure in the present application. In the description of the present application, it should further be noted that, the term "install", "connect", and "couple" should be interpreted in a broad sense unless explicitly defined and limited otherwise, which, for example, may mean a fixed connection, a detachable connection or an integral connection, or may be a direct connection, an indirect connection by means of an intermediate medium, or internal communication between two elements. For those of ordinary skills in the art, the specific meanings of the terms mentioned above in the present application may be construed according to specific circumstances.

The term "and/or" in the present application is merely a description of the associated relationship of associated objects, representing that three relationships may exist, for example, A and/or B, may be expressed as: there are three cases of A alone, both A and B, and B alone. In addition, the character "/" in the present application generally indicates that the associated context objects are in the relationship of "or".

In the present application, a battery cell may include a lithium ion secondary battery, a lithium ion primary battery, a lithium sulfur battery, a sodium lithium ion battery, a sodium ion battery or a magnesium ion battery, etc., which will not be limited in the embodiments of the present application. The battery cell may have a cylindrical shape, a flat shape, a cuboid shape or another shape, which is also not limited in the embodiments of the present application. The battery cells are generally classified into three types depending on the way of packaging: cylindrical battery cells, prismatic battery cells and pouch battery cells, which are also not limited in the embodiments of the present application.

A battery mentioned in the embodiments of the present application refers to a single physical module comprising one or more battery cells to provide a higher voltage and capacity. For example, the battery mentioned in the present application may comprise a battery pack, etc. The battery may comprise a case for packaging one or more battery cells therein. The case can prevent liquid or other foreign objects from affecting charging or discharging of the battery cell.

The battery cell comprises an electrode assembly and an electrolyte, the electrode assembly being composed of a positive electrode plate, a negative electrode plate and a separator. The operation of the battery cell mainly relies on the movement of metal ions between the positive electrode plate and the negative electrode plate. The positive electrode plate comprises a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium-ion battery as an example, A material of which the positive electrode current collector is made may be aluminum, and the positive electrode active material may be lithium cobalt oxides, lithium iron phosphate, ternary lithium or lithium manganate, etc. The negative electrode plate comprises a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. A material of which the negative electrode current collector is made may be copper, and the negative electrode active material may be carbon or silicon, etc. In order to ensure that no fusing occurs when a large current flows through, a plurality of positive electrode tabs are provided and are laminated together, and a plurality of negative electrode tabs are provided and are laminated together. A material of which the separator is made may be polypropylene (PP) or polyethylene (PE), etc. In addition, the electrode assembly may have a winding structure or a laminated structure, and the embodiments of the present application are not limited thereto.

The battery may comprise a plurality of battery cells in order to meet different power demands, wherein the plurality of battery cells may be in series connection, parallel connection or series-parallel connection. The series-parallel connection refers to a combination of series connection and parallel connection. Optionally, the plurality of battery cells may be connected in series or parallel or series and parallel to form a battery module, and a plurality of battery modules may then be connected in series or parallel or series and parallel to form the battery. That is to say, the plurality of battery cells may directly constitute the battery, or may first constitute the battery modules that may then constitute the battery. The battery is further arranged in a power consuming device to supply electric energy to the power consuming device.

Design factors on many aspects should be simultaneously considered for the 5 development of the battery technology, for example, performance parameters such as energy density, cycle life, discharge capacity, and charge-discharge rate. In addition, the safety of batteries should also be taken into account.

For battery cells, main safety hazards occur during charging and discharging, such that an appropriate temperature design should also be taken into account. In order to control the battery cells to be at an appropriate temperature, a cooling system may be provided in the battery. The cooling system is configured for accommodating a cooling medium to cool the battery cells. The cooling system may also be referred to as a cooling component or a cooling plate or the like, and the cooling medium may also be referred to as a cooling fluid, and more specifically, may be referred to as a cooling liquid or a cooling gas. The cooling fluid circulates to achieve a better effect of temperature regulation. Optionally, the cooling medium may be water, a mixture of water and ethylene glycol, or air, etc. If the cooling medium is water, the cooling system may also be referred to as a water cooling plate.

In high-temperature and high-humidity environment, a condensate is likely to be formed inside a case of the battery, which will cause potential safety hazards and impairs the safety of the battery. Specifically, a gas at high temperature and high humidity in the battery may generate a condensate when encountering a cooling component in the case of the battery, and the condensate may affect the safety of the battery if it drips to an electrical connection region in the battery.

In view of this, the present application provides a technical solution in which a liquid collection structure is provided on a cooling component, a condensate generated by the cooling component is gathered by means of the liquid collection structure, a liquid storage structure corresponding to the liquid collection structure is further provided on a wall of the case of the battery, and the condensate gathered by the liquid collection structure is collected by using the liquid storage structure. In this way, the condensate can be kept away from the electrical connection region of the battery, and therefore, the safety of the battery can be enhanced.

In the case of the battery, in addition to the battery cells and the cooling component mentioned above, a busbar component and other components of the battery may be comprised. In some embodiments, a structure for fixing the battery cells may further be provided in the case. The case may be shaped depending on the plurality of battery cells accommodated. In some embodiments, the case may be square with six walls. Optionally, a bottom wall and a top wall of the case may be integrated with cooling components to respectively cool the battery cells at the bottom and the top of the case. Side walls of the case are provided with beams, each beam comprises a plurality of sub-walls, and the plurality of sub-walls form a hollow beam structure, namely, the beam has a cavity therein. Optionally, apart from the bottom and top of the case, a cooling component may also be arranged in the middle of the case to further enhance the cooling effect.

In the embodiments of the present application, the liquid collection structure may be arranged on the cooling component at the top of the case, for example, the cooling component integrated in the top wall/upper cover of the case. The liquid storage structure may be arranged in the beam of the case. In this way, the liquid collection structure can gather the condensate generated by the cooling component above the liquid storage structure in the beam, thereby collecting the condensate in the liquid storage structure, such that the condensate is kept away from the electrical connection region in the battery, such as a busbar component.

The busbar component is configured for achieving an electrical connection between the plurality of battery cells, such as parallel connection, series connection, or series and parallel connection. The busbar component may achieve the electrical connection between the battery cells by connecting electrode terminals of the battery cells. In some embodiments, the busbar component may be fixed to the electrode terminals of the battery cells by means of welding. The busbar component transmits the voltage of the battery cells, and a plurality of battery cells obtain a higher voltage after being connected in series. Accordingly, the electrical connection formed by the busbar components may also be referred to as a "high-voltage connection".

In addition to the busbar component, a sensor for sensing a state of the battery cells, for example, sensing the temperature of the battery cells, or the state of charge may further be provided in the battery. In the embodiments of the present application, the electrical connection region in the battery may comprise an electrical connection region formed by the busbar component and/or an electrical connection region in the sensor.

The busbar component and the sensor may be packaged in an insulating layer 5 to form a signal transmission assembly. Accordingly, the signal transmission assembly may be configured for transmitting the voltage and/or sensing signals of the battery cells. The signal transmission assembly has no insulating layer at its connections to the electrode terminals of the battery cells, namely, the insulating layer has holes at the connections so as to facilitate connection to the electrode terminals of the battery cells.

A pressure balancing mechanism may further be provided on the case of the battery for balancing the pressures inside and outside the case. For example, when the pressure inside the case is higher than the pressure outside the case, the gas inside the case may flow outside of the case through the pressure balancing mechanism; when the pressure inside the case is lower than the pressure outside the case, the gas outside the case may flow into the case through the pressure balancing mechanism. Optionally, the pressure balancing mechanism may be a pressure relief mechanism of the case, and the pressure relief mechanism is configured for actuating to relieve the internal pressure of the case when the internal pressure reaches a threshold.

It should be understood that the various components in the battery case described above should not be construed as limiting the embodiments of the present application, that is to say, the case for a battery of the embodiments of the present application may or may not comprise the components described above.

The technical solutions described in the embodiments of the present application are all applicable to various devices using batteries, such as mobile phones, portable devices, notebook computers, electromobile, electric toys, electric power tools, electric vehicles, ships and space vehicles, for example, the space vehicles including airplanes, rockets, space shuttles and spacecrafts, etc.

It should be understood that the technical solutions described in the embodiments of the present application are applicable not only to the devices described above, but also to all devices using batteries, but for brevity of description, the embodiments described below are illustrated with an electric vehicle as an example.

For example, as shown in FIG. 1, which is a schematic structural diagram of a vehicle 1 according to an embodiment of the present application, the vehicle 1 may be a fuel vehicle, a gas vehicle or a new-energy vehicle. The new-energy vehicle may be a battery electric vehicle, a hybrid vehicle, an extended-range vehicle, etc. The vehicle 1 may be internally provided with a motor 40, a controller 30, and a battery 10. The controller 30 is configured, for example, to control the battery 10 to supply power to the motor 40. For example, the battery 10 may be arranged at the bottom or the head or the tail of the vehicle 1. The battery 10 may be configured for supplying power to the vehicle 1. For example, the battery 10 may serve as an operation power source for the vehicle 1 for use in a circuitry of the vehicle 1, for example, to meet the operating power demand of the vehicle 1 during the start-up, navigation and running. In another embodiment of the present application, the battery 10 can not only serve as an operating power source for the vehicle 1, but also serve as a driving power source for the vehicle 1, instead of or partially instead of fuel or natural gas, to provide driving power for the vehicle 1.

Figure 2:
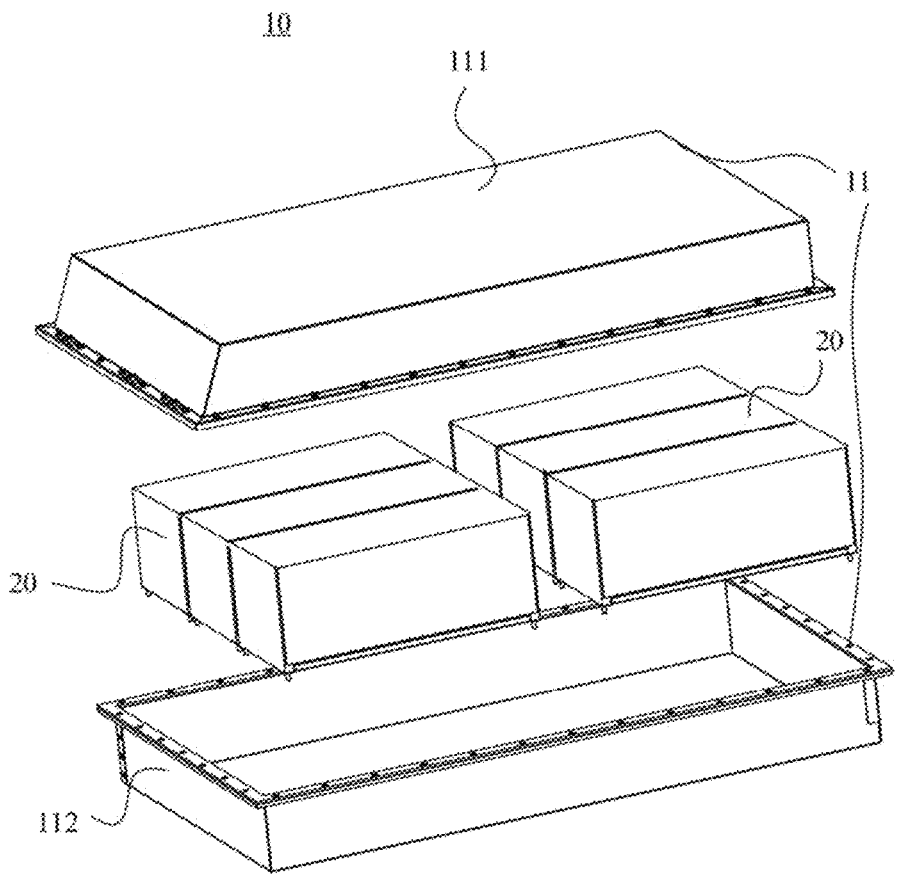
FIG. 2 is a schematic diagram of a battery according to an embodiment of the present application.

The battery 10 may comprise a plurality of battery cells in order to meet different power demands. For example, as shown in FIG. 2, which is a schematic structural diagram of a battery 10 according to an embodiment of the present application. The battery 10 may comprise a plurality of battery cells 20. The battery 10 may further comprise a case 11, the interior of the case 11 is a hollow structure, and the plurality of battery cells 20 are accommodated in the case 11. As shown in FIG. 2, the case 11 may comprise two portions, referred to herein as a first portion 111 (upper case) and a second portion 112 (lower case) respectively, and the first portion 111 and the second portion 112 are snap-fitted together. The first portion 111 and the second portion 112 may be shaped depending on the shape of a combination of the plurality of battery cells 20, and each of the first portion 111 and the second portion 112 has an opening. For example, each of the first portion 111 and the second portion 112 may be a hollow cuboid and has only one open side, an opening of the first portion 111 and an opening of the second portion 112 are arranged opposite to each other, and the first portion 111 and the second portion 112 are snap-fitted to each other to form the case 11 having a closed cavity. The plurality of battery cells 20 are connected to one another in parallel or in series or in series and parallel before being placed in the case 11 formed by snap-fitting the first portion 111 and the second portion 112.

Optionally, the battery 10 may further comprise other structures, which will not be described in detail herein. For example, the battery 10 may further comprise a busbar component for achieving an electrical connection between the plurality of battery cells 20, such as parallel connection, series connection or series and parallel connection. Specifically, the busbar component may achieve the electrical connection between the battery cells 20 by connecting electrode terminals of the battery cells 20. Further, the busbar component may be fixed to the electrode terminals of the battery cells 20 by means of welding. Electrical energy from the plurality of battery cells 20 may be further extracted by means of an electrically conductive mechanism passing through the case 11. Optionally, the conductive mechanism may also a busbar component.

The number of the battery cells 20 may be set as any numerical value according to different power demands. The plurality of battery cells 20 may be connected in series, parallel, or series and parallel to achieve large capacity or high power. Since each battery 10 may comprise a large number of battery cells 20, the battery cells 20 may be arranged in groups, and each group of battery cells 20 constitutes a battery module, for ease of installation. The number of the battery cells 20 included in the battery module is not limited and may be set according to demands. The battery may comprise a plurality of battery modules that may be connected in series, parallel, or series and parallel.

Figure 3:
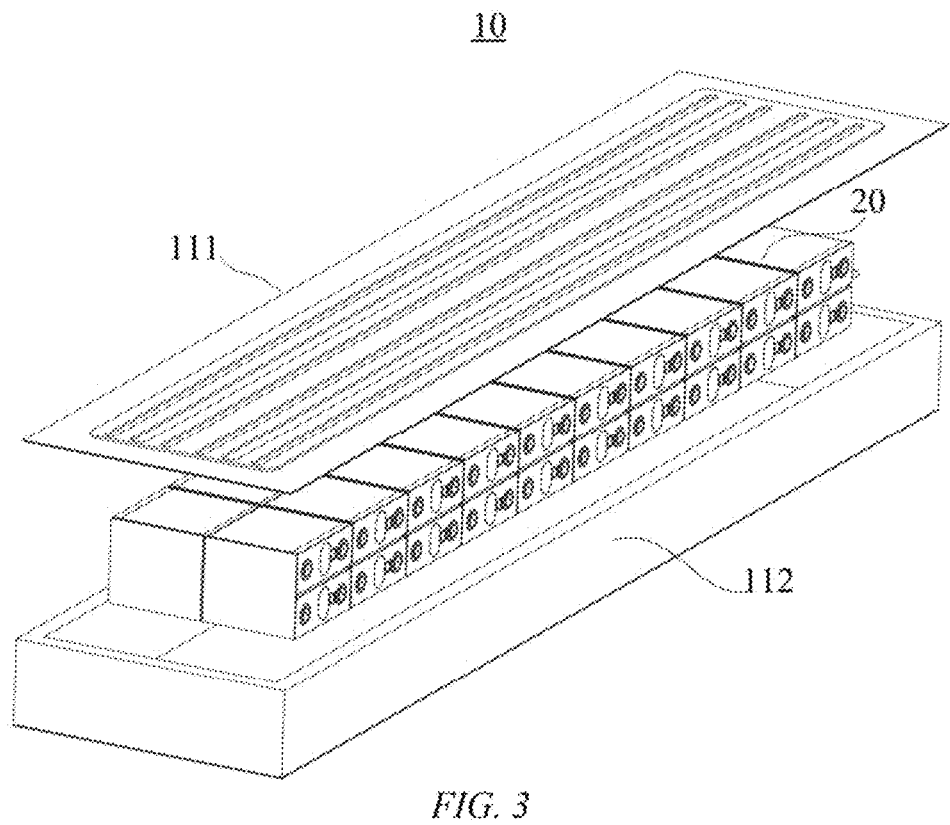
FIG. 3 is a schematic diagram of a battery according to an embodiment of the present application.

Optionally, as shown in FIG. 3, the first portion 111 of the case 11 may be an upper cover having no opening, namely, the first portion 111 is a flat plate-shaped upper cover. The upper cover may be integrated with a cooling component so as to cool the battery cells 20 at the top of the case 11. The second portion 112 of the case 11 is a cavity with an opening, and comprises a bottom wall and side walls. The bottom wall may be integrated with a cooling component so as to cool the battery cells 20 at the bottom of the case 11. The side walls of the case may be provided with beams, each beam comprises a plurality of sub-walls, and the plurality of sub-walls form a hollow beam structure, namely, the beam has a cavity therein.

Optionally, apart from the bottom and top of the case 11, a cooling component may further be arranged in the middle of the case 11. For example, a cooling component may also be arranged between upper and lower rows of battery cells 20 so as to further enhance the cooling effect.

Optionally, the walls of the battery cells 20 provided with the electrode terminals in the case 11 may be perpendicular to the bottom wall of the case 11. That is to say, the battery cells 20 may be placed horizontally ("lie flat"). In this way, a cooling component may be arranged between every two rows of battery cells 20 in a direction 5 perpendicular to the bottom wall of the case 11, and correspondingly, a cooling component may be arranged on either of each battery cell 20. Optionally, the side wall having the largest area of each battery cell 20 is connected to a cooling component, thereby cooling the battery cells 20 to a greater extent.

Figure 4:
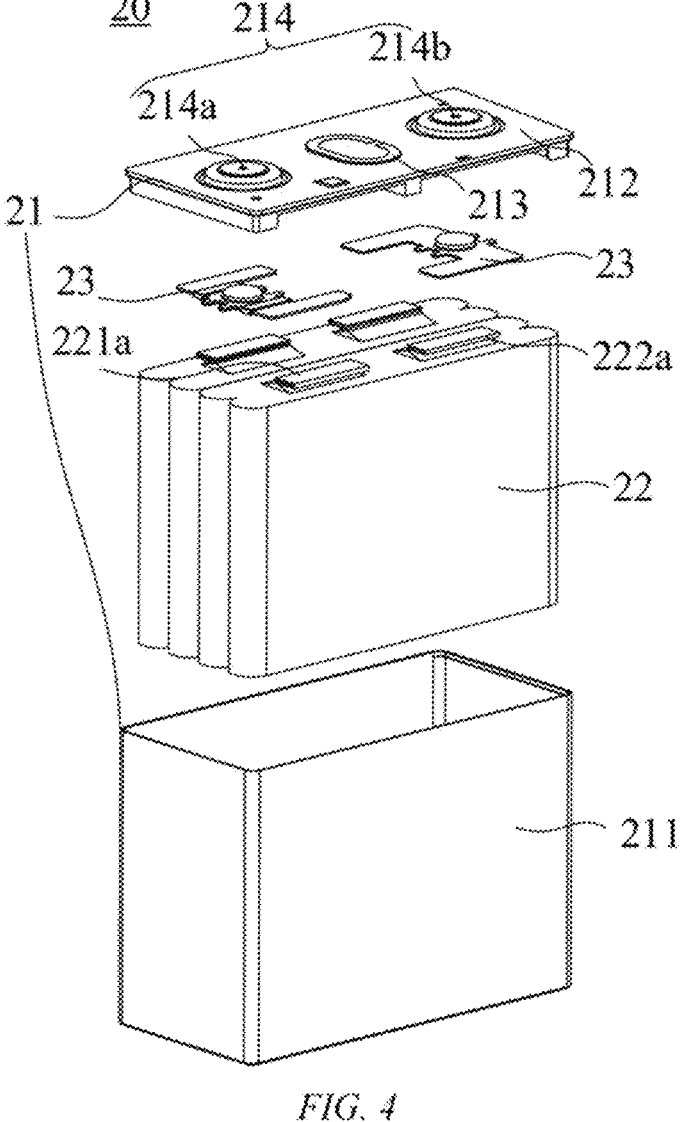
FIG. 4 is a schematic diagram of a battery cell according to an embodiment of the present application.

As shown in FIG. 4, which is a schematic structural diagram of a battery cell 20 according to an embodiment of the present application. The battery cell 20 comprises one or more electrode assemblies 22, a shell 211, and a cover plate 212. The shell 211 and the cover plate 212 form a housing or battery box 21. Walls of the shell 211 and the cover plate 212 are both referred to as walls of the battery cell 20, wherein for the cuboid battery cell 20, the walls of the shell 211 include a bottom wall and four side walls. The shell 211 may be determined according to the shape of a combination of the one or more electrode assemblies 22, for example, the shell 211 may be a hollow cuboid, cube or cylinder, and one of surfaces of the shell 211 has an opening such that the one or more electrode assemblies 22 can be placed in the shell 211. For example, when the shell 211 is a hollow cuboid or cube, one of the planes of the shell 211 is a plane in which an opening is located, that is to say no wall is in plane, which allows communication between the inside and the outside of the shell 211. When the shell 211 may be a hollow cylinder, an end face of the shell 211 is a face with an opening, namely, the end face having no wall allows communication between the inside and the outside of the shell 211. The cover plate 212 covers the opening and is connected to the shell 211 to form a closed cavity for placing the electrode assemblies 22 therein. The shell 211 is filled with an electrolyte, such as a liquid electrolyte.

The battery cell 20 may further comprise two electrode terminals 214, and the two electrode terminals 214 may be arranged on the cover plate 212. The cover plate 212 is generally in the form of a flat plate, the two electrode terminals 214 are fixed to a flat plate shaped face of the cover plate 212, and the two electrode terminals 214 are respectively a positive electrode terminal 214a and a negative electrode terminal 214b. Each of the electrode terminals 214 is correspondingly provided with a connecting member 23 which, also referred to as a liquid collecting member 23, is located between the cover plate 212 and the electrode assembly 22 for electrically connecting the electrode assembly 22 and the electrode terminal 214.

As shown in FIG. 4, each electrode assembly 22 has a first tab 221a and a second 5 tab 222a. The first tab 221a and the second tab 222a have opposite polarities. For example, when the first tab 221a is a positive electrode tab, the second tab 222a is a negative electrode tab. The first tab 221a of the one or more electrode assemblies 22 is connected to an electrode terminal by means of a connecting member 23, and the second tab 222a of the one or more electrode assemblies 22 is connected to another electrode terminal by means of another connecting member 23. For example, the positive electrode terminal 214a is connected to the positive electrode tab by means of a connecting member 23, and the negative electrode terminal 214b is connected to the negative electrode tab by means of another connecting member 23.

In the battery cell 20, according to practical use demands, one or more electrode assemblies 22 may be provided. As shown in FIG. 4, four independent electrode assemblies 22 are provided in the battery cell 20.

A pressure relief mechanism 213 may also be provided on the battery cell 20. The pressure relief mechanism 213 is configured for actuation when an internal pressure or temperature of the battery cell 20 reaches a threshold, so as to release the internal pressure or temperature.

The pressure relief mechanism 213 may be of a variety of possible pressure relief structures, and the embodiments of the present application are not limited thereto. For example, the pressure relief mechanism 213 may be a temperature-sensitive pressure relief mechanism configured to melt when the internal temperature of the battery cell 20 provided with the pressure relief mechanism 213 reaches a threshold; and/or the pressure relief mechanism 213 may be a pressure-sensitive pressure relief mechanism configured to fracture when the internal gas pressure of the battery cell 20 provided with the pressure relief mechanism 213 reaches a threshold.

Figure 5:
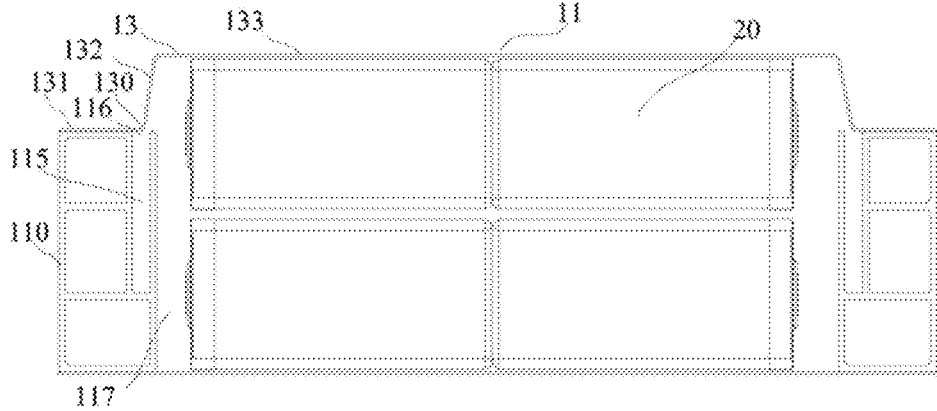
FIG. 5 is a schematic diagram of a case of a battery according to an embodiment of the present application.

FIG. 5 shows a schematic structural diagram of a case 11 of a battery according to an embodiment of the present application. As shown in FIG. 5, the case 11 may comprise a cooling component 13 and a first wall 110.

The cooling component 13 is configured for accommodating a cooling medium to cool the battery cell 20. The cooling medium may circulate to achieve a better effect of temperature regulation. Optionally, the cooling medium may be water, a mixture of water and ethylene glycol, or air, etc., and the embodiments of the present application are not limited thereto.

A liquid collection structure 130 is provided on the cooling component 13, and the liquid collection structure 130 is configured to gather a condensate generated by the cooling component 13. The interior in the battery 10 at a high temperature and high humidity, and a gas at the high temperature and high humidity in the battery 10 generates the condensate when encountering the cooling component 13. In the embodiment of the present application, the liquid collection structure 130 is arranged on the cooling component 13 such that the condensate accumulates in the liquid collection structure 130. Optionally, the liquid collection structure 130 may be a structure having a large curvature, for example, a sharp structure. In this way, the liquid collection structure 130 having the larger curvature is more likely to collect the condensate compared with other planar regions of the cooling component 13, and accordingly, the condensate can be gathered at a specific position.

A liquid storage structure 115 is provided on the first wall 110, the liquid storage structure 115 is arranged corresponding to the liquid collection structure 130, and the liquid storage structure 115 is configured to collect the condensate gathered by the liquid collection structure 130. The liquid storage structure 115 may be arranged at a position where the condensate gathered by the liquid collection structure 130 drips, for example, the liquid storage structure 115 may be arranged in the direction of gravity of the liquid collection structure 130. In this way, the condensate gathered by the liquid collection structure 130 can drip into the liquid storage structure 115, thereby collecting the condensate generated by the cooling component 13.

In the embodiments of the present application, the liquid collection structure 130 is provided on the cooling component 13, the condensate generated by the cooling component 13 is gathered by using the liquid collection structure 130, the liquid storage structure 115 corresponding to the liquid collection structure 130 is provided on the first wall 110 of the case 11, and the condensate gathered by the liquid collection structure 130 is collected by using the liquid storage structure 115. In this way, it is possible to keep the condensate away from the electrical connection region in the case 11, and therefore, the safety of the battery 10 can be enhanced.

The technical solution of the embodiments of the present application may be applied to the battery 10 having the cooling component 13. Optionally, in an embodiment of the present application, the cooling component 13 may be arranged at the top of the case 11. For example, the cooling component 13 may be integrated in the upper cover of the case 11 so as to reduce occupied space. The first wall 110 may be a side wall of the case 11. Accordingly, the liquid collection structure 130 may be arranged at an end portion of the cooling component 13, i.e., at a region close to the first wall 110, such that the condensate may condense at the end portion of the cooling component 13, and is collected in the liquid storage structure 115 in the side wall of the case 11 so as to be kept away from the electrical connection region in the case 11.

Figure 6:
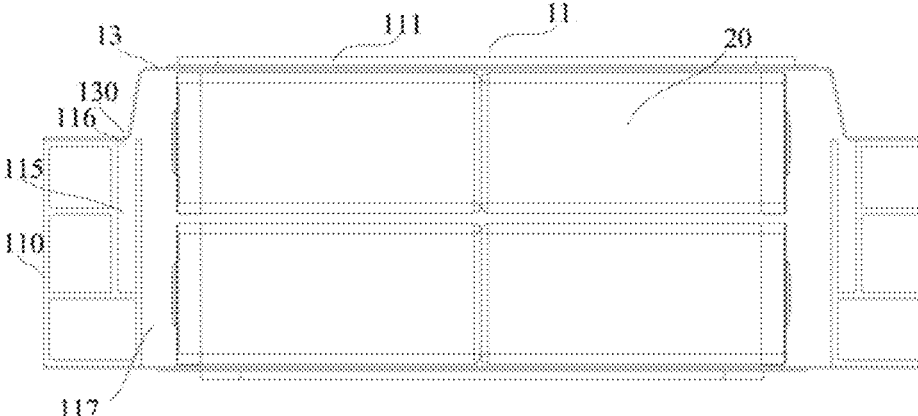
FIG. 6 is a schematic diagram of a case of a battery according to an embodiment of the present application.

Optionally, in an embodiment of the present application, the cooling component 13 may alternatively not be integrated with the upper cover of the case 11. As shown in FIG. 6, the cooling component 13 is arranged at the top of the case 11 and attached to a surface of the battery cell 20, and the upper cover 111 of the case 11 covers the cooling component 13, such that the cooling component 13 can be protected.

Optionally, in an embodiment of the present application, the cooling component 13 may comprise a connecting region 131, a transitional region 132, and a main body region 133. The connecting region 131 is configured to connect the first wall 110, the connecting region 131 and the main body region 133 are located in different planes, the transitional region 132 connecting the connecting region 131 and the main body region 133 to form two corner structures, and the one of the two corner structures close to the liquid storage structure 115 forms the liquid collection structure 130.

For example, a region of the cooling component 13 close to the first wall 110 is bent toward the first wall 110 to form the connecting region 131 and the transitional region 132 connecting the connecting region 131 and the main body region 133. The two corner structures are formed at a position where the connecting region 131 is connected to the transitional region 132, and at a position where the transitional region 132 is connected the main body region 133, wherein the corner structure close to the first wall 110 forms the liquid collection structure 130. The corner structure has a larger curvature compared with other planar regions of the cooling component 13, and makes the condensate more likely to accumulate, such that the condensate can accumulate at this corner structure.

Optionally, in an embodiment of the present application, a plane in which the connecting region 131 is located is closer to the liquid storage structure 115 than a plane in which the main region 133 is located. For example, the connecting region 131 is closer to the bottom wall of the case 11 than the main body region 133, i.e., being lower. The corner structure formed by connecting the transitional region 132 and the connecting region 131 forms the liquid collection structure 130. In this case, the condensate at an upper corner structure may also flow to a lower corner structure along the transitional region 132, i.e., the liquid collection structure 130. That is to say, with the above arrangement, more condensate accumulates in the liquid collection structure 130 and then enters the liquid storage structure 115.

Figure 7:
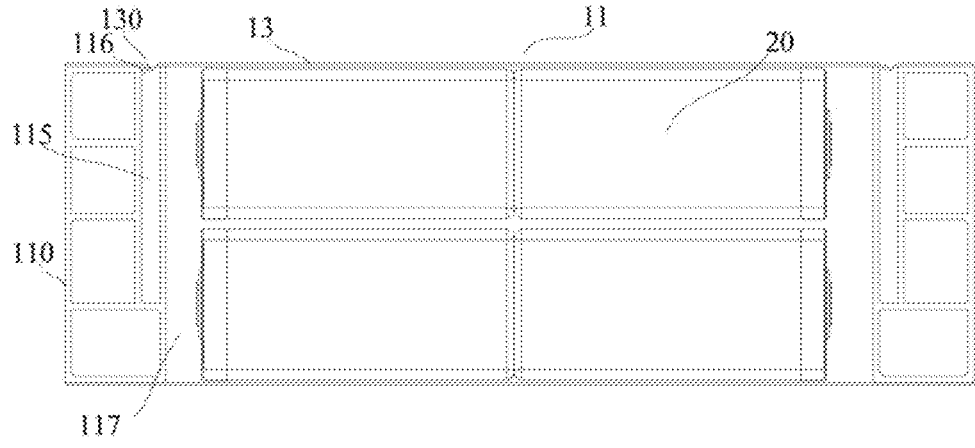
FIG. 7 is a schematic diagram of a case of a battery according to an embodiment of the present application.

Optionally, in an embodiment of the present application, as shown in FIG. 7, the cooling component 13 projects toward the liquid storage structure 115 at a position corresponding to the liquid storage structure 115, so as to form the liquid collection structure 130. A projecting region has a larger curvature compared with other planar regions of the cooling component 13, and makes the condensate more likely to be gathered, such that the condensate can be gathered in this region. In the foregoing embodiment, the cooling component 13 is bent toward the first wall 110 to finally form the liquid collection structure 130. In this embodiment, the cooling component 13 is not bent, but projects toward the liquid storage structure 115 in a region close to the first wall 110, so as to form the liquid collection structure 130 corresponding to the liquid storage structure 115. In this way, the cooling component 13 needs not to be bent, such that process complexity can be reduced.

Optionally, the liquid collection structure 130 may be a pointed projection, that is, a convex tip, or an arc-shaped projection, that is, a bump. The pointed projection or the arc-shaped projection has a large curvature, and can gather the condensate.

It should be understood that the liquid collection structure 130 may also adopt other structures having a relatively large curvature, and the embodiments of the present application are not limited thereto.

Optionally, in an embodiment of the present application, the liquid storage structure 115 is isolated from an electrical chamber 117 of the case 11. The electrical chamber 117 is a cavity for accommodating the battery cells 20 in the case 11. By isolating the liquid storage structure 115 from the electrical chamber 117, the fact that the condensate enters the electrical chamber 117 and then comes into contact with electrical connections within the electrical chamber 117 is avoided.

Optionally, in an embodiment of the present application, the first wall 110 comprises a plurality of sub-walls which are connected to form a cavity of the liquid storage structure 115, an opening 116 of the cavity corresponding to the liquid collection structure 130. As shown in FIGS. 5-7, the plurality of sub-walls of the first wall 110 form a hollow beam structure, i.e., the beam has a cavity therein. In this way, the strength of the case 11 may be ensured, the weight of the case 11 may also be reduced, and other components may also be arranged inside the beam to meet specific demands. In this embodiment, the cavity has the opening 116 at a position corresponding to the liquid collection structure 130 to form the liquid storage structure 115, such that the condensate gathered by the liquid collection structure 130 can be allowed to enter the liquid storage structure 115 through the opening 116.

Optionally, in an embodiment of the present application, the opening 116 is provided in the direction of gravity of the liquid collection structure 130. In this way, the condensate gathered by the liquid collection structure 130 can drip into the liquid storage structure 115 through the opening 116.

Optionally, in an embodiment of the present application, a moisture adsorption structure may be arranged in the liquid storage structure 115 for adsorbing the condensate. The condensate is adsorbed by the moisture adsorption structure, such that the condensate can be prevent from diffusing, and potential safety hazards can be reduced.

Optionally, in an embodiment of the present application, a flow guiding structure may be provided in the first wall 110 for discharging the condensate from the case 11. Specifically, a flow channel may be provided in the first wall 110, and this flow channel is connected to the liquid storage structure 115 at an end for discharging the condensate.

For example, the flow channel may be connected to an one-way gravity valve at the other end for discharging the condensate in the flow channel from the case 11 when the gravity of the condensate in the flow channel reaches a threshold.

The one-way gravity valve is opened when the gravity of the liquid in the flow channel reaches the threshold, allowing the liquid to be discharged downward while reverse entrance of external gases is impossible. Optionally, the flow channel may be configured to have a greater length in the direction of gravity, so as to be adapted to the gravity of the one-way gravity valve during opening.

Optionally, the other end of the flow channel may be in direct communication with the outside of the case 11 without connection to the one-way gravity valve, for example, communication with the outside of the case 11 via a through hole in the first wall 110.

Optionally, in an embodiment of the present application, the bottom of the liquid storage structure 115 may be configured to have an arc shape in order to direct the condensate to the flow channel. For example, the liquid storage structure 115 may be of an arc-shaped structure with a wide top and a narrow bottom, the larger opening 116 at an upper portion may facilitate collection of the condensate, and the narrower design at a lower portion may facilitate introduction of the condensate into the flow channel.

Optionally, in an embodiment of the present application, the bottom of the liquid storage structure 115 may also be directly connected to the one-way gravity valve. In this case, the bottom of the liquid storage structure 115 may extend to the bottom of the case 11, and the one-way gravity valve is arranged at the bottom of the case 11.

The condensate can be discharged from the case 11 by means of the flow guiding structure, such as the flow channel and/or the one-way gravity valve, which reduces the potential safety hazards and thus ensures the safety of the battery 10.

An embodiment of the present application further provides a battery 10. The battery 10 may comprise battery cells 20, and a case 11 as described in the foregoing embodiments, wherein the battery cells 20 are accommodated in the case 11.

Optionally, the battery 10 may further comprise other components, for example, a busbar component or a sensor, and the embodiments of the present application are not limited thereto.

Figure 8:
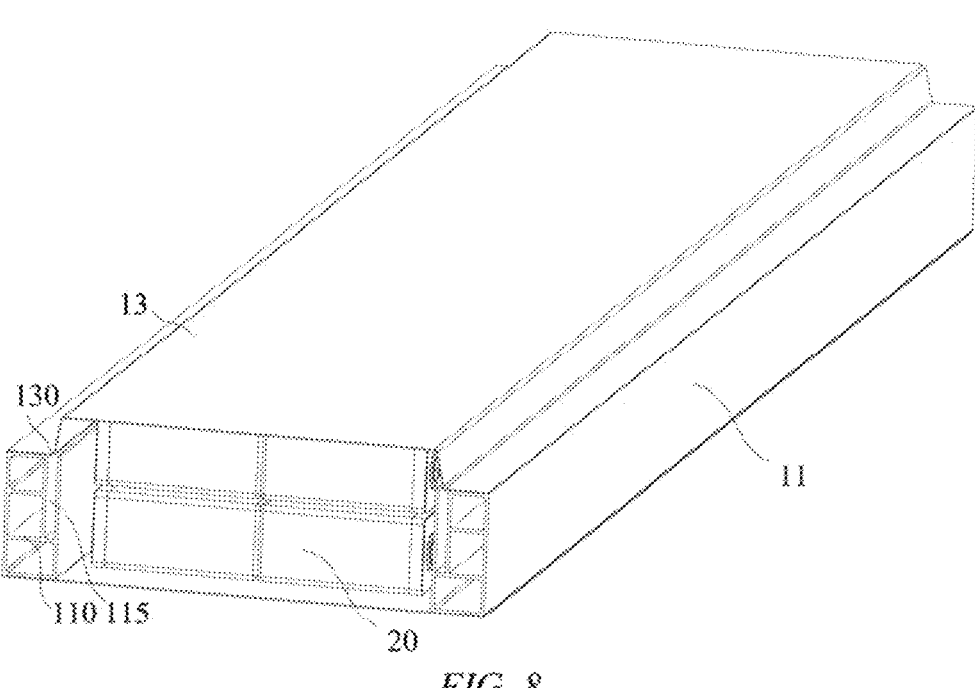
FIG. 8 is a schematic diagram of a battery according to an embodiment of the present application.

FIG. 8 is a schematic diagram of a battery 10 according to an embodiment of the present application. As shown in FIG. 8, the battery 10 may comprise a case 11 and a plurality of battery cells 20.

The case 11 may be the case 11 described in the foregoing embodiments. For example, the case 11 comprises a cooling component 13, a liquid collection structure 130 is provided on the cooling component 13, and the liquid collection structure 130 is configured for gathering condensate generated by the cooling component 13. A liquid storage structure 115 is provided on a first wall 110 of the case 11, the liquid storage structure 115 is arranged corresponding to the liquid collection structure 130, and the liquid storage structure 115 is 5 configured to collect the condensate gathered by the liquid collection structure 130.

The battery cell 20 may be the battery cell 20 described in the foregoing embodiments, for example, the battery cells 20 may be the battery cells 20 in FIG. 4.

The battery 10 may further comprise a busbar component for electrical connection between the plurality of battery cells 20. The battery 10 may further comprise a sensor for sensing a state of the battery cells 20.

Optionally, the walls of the battery cells 20 that are provided with electrode terminals may be perpendicular to a bottom wall of the case 11. That is to say, the battery cells 20 may be placed horizontally ("lie flat"). Optionally, the side wall having the largest area of each of the battery cells 20 is connected to a cooling component, thereby cooling the battery cells 20 to a greater extent.

Reference may be made to the foregoing embodiments for the specific description of the various components in the battery 10, which, for the sake of brevity, will not be repeated herein.

An embodiment of the present application further provides a power consuming device that may comprise the battery 10 according to the foregoing embodiments, the battery 10 being configured for supplying electric energy to the power consuming device. Optionally, the power consuming device may be a vehicle 1, a ship or a spacecraft.

The case 11 of the battery, the battery 10 and the power consuming device according to the embodiments of the present application are described above, a method and an apparatus for manufacturing a battery according to the embodiments of the present application will now be described below, wherein portions not described in detail can be found with reference to the foregoing embodiments.

Figure 9:
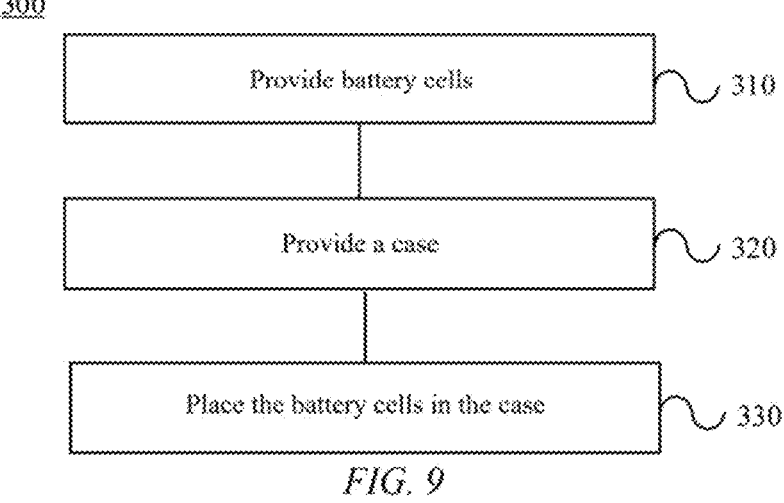
FIG. 9 is a schematic flow chart of a method for manufacturing a battery according to an embodiment of the present application.

FIG. 9 shows a schematic flow chart of a method 300 for manufacturing a battery according to an embodiment of the present application. As shown in FIG. 9, the method 300 may comprise:

step 310 of providing battery cells 20; and step 320 of providing a case 11, the case 11 comprising:

a cooling component 13, a liquid collection structure 130 being provided on the cooling component 13, and the liquid collection structure 130 being configured to gather a condensate generated by the cooling component 13; and a first wall 110, a liquid storage 5 structure 115 being provided on the first wall 110, the liquid storage structure 115 being arranged corresponding to the liquid collection structure 130, and the liquid storage structure 115 being configured to collect the condensate gathered by the liquid collection structure 130; and step 330 of placing the battery cells 20 in the case 11.

Figure 10:
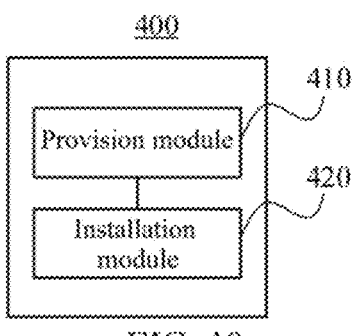
FIG. 10 is a schematic block diagram of an apparatus for manufacturing a battery according to an embodiment of the present application.

FIG. 10 shows a schematic block diagram of an apparatus 400 for manufacturing a battery according to an embodiment of the present application. As shown in FIG. 10, the apparatus 400 for manufacturing a battery may comprise: a provision module or structure 410 and an installation module or structure 420.

The provision module 410 is configured to: provide battery cells 20 and a case 11, the case 11 comprising: a cooling component 13, a liquid collection structure 130 being provided on the cooling component 13, and the liquid collection structure 130 being configured to gather a condensate generated by the cooling component 13; and a first wall 110, a liquid storage structure 115 being provided on the first wall 110, the liquid storage structure 115 being arranged corresponding to the liquid collection structure 130, and the liquid storage structure 115 being configured to collect the condensate gathered by the liquid collection structure 130.

The installation module 420 is configured to place the battery cells 20 in the case 11.

Although the present application is described with reference to the preferred embodiments, various improvements may be made thereto, and the components thereof may be replaced with equivalents, without departing from the scope of the present application. In particular, various technical features mentioned in the embodiments may be combined together in any manner, as long as there is no structural conflict. The present application is not limited to specific embodiments disclosed herein, but includes all technical solutions that fall within the scope of the claims.

The invention claimed is:

1. A case of a battery, comprising:

a cooling structure configured to be directly and physically attached to a surface of a battery cell accommodated in the case, a liquid collection structure being arranged on the cooling structure, and the liquid collection structure being configured to gather a condensate generated by the cooling structure; and a first wall, a liquid storage structure being arranged on the first wall, the liquid storage structure being arranged corresponding to the liquid collection structure, and the liquid storage structure being configured to collect the condensate gathered by the liquid collection structure, wherein the cooling structure comprises a connecting region, a transitional region and a main body region, the connecting region being configured to connect to the first wall, the connecting region and the main body region being located in parallel but different planes, the transitional region connecting the connecting region and the main body region to form two corner structures, and one of the two corner structures close to the liquid storage structure forms the liquid collection structure.

2. The case according to claim 1, wherein the cooling structure projects toward the liquid storage structure at a position corresponding to the liquid storage structure to form the liquid collection structure.

3. The case according to claim 2, wherein the liquid collection structure is a pointed projection or an arc-shaped projection.

4. The case according to claim 1, wherein a plane in which the connecting region is located is closer to the liquid storage structure than a plane in which the main body region is located; and the one corner structure formed by connecting the transitional region to the connecting region forms the liquid collection structure.

5. The case according to claim 1, wherein the first wall comprises a plurality of sub-walls connected to form a cavity of the liquid storage structure, with an opening of the cavity corresponding to the liquid collection structure.

6. The case according to claim 5, wherein the opening is provided in the direction of gravity of the liquid collection structure.

7. The case according to claim 1, wherein the liquid storage structure is isolated from an electrical chamber of the case, and the electrical chamber is configured to accommodate battery cells.

8. The case according to claim 1, wherein a moisture adsorption structure is provided in the liquid storage structure for adsorbing the condensate.

9. The case according to claim 1, wherein a flow guiding structure is provided in the first wall for discharging the condensate from the case.

10. A battery, comprising:

battery cells; and the case according to claim 1, wherein the battery cells are accommodated in the case.

11. A power consuming device, comprising: the battery according to claim 10, the battery being configured to supply electric energy.

12. The case according to claim 1, wherein the transitional region connects the connecting region and the main body region along a plane that is inclined at a non-vertical angle relative to the planes of the connecting region and the main body region to form the two corner structures.

13. A case of a battery, comprising:

a cooling structure configured to be directly and physically attached to a surface of a battery cell accommodated in the case, a liquid collection structure being arranged on the cooling structure, and the liquid collection structure being configured to gather a condensate generated by the cooling structure; and a first wall, a liquid storage structure being arranged on the first wall, the liquid storage structure being arranged corresponding to the liquid collection structure, and the liquid storage structure being configured to collect the condensate gathered by the liquid collection structure, wherein the cooling structure comprises a connecting region, a transitional region and a main body region, the connecting region being configured to connect to the first wall, the connecting region and the main body region being located in parallel but different planes, the transitional region connecting the connecting region and the main body region along a plane that is inclined at a non-vertical angle relative to the planes of the connecting region and the main body region to form two corner structures, and one of the two corner structures close to the liquid storage structure forming the liquid collection structure.

* * * * *